United States Patent [19]
Nakamura et al.

[11] Patent Number: 6,164,421
[45] Date of Patent: Dec. 26, 2000

[54] DISC BRAKE ASSEMBLY

[75] Inventors: Yasushi Nakamura, Itami; Kazuhiro Fujii, Sakai, both of Japan

[73] Assignee: Shimano Inc., Osaka, Japan

[21] Appl. No.: 09/172,242

[22] Filed: Oct. 14, 1998

[51] Int. Cl.$^7$ .................................................. F16D 55/36
[52] U.S. Cl. ............................................................. 188/71.5
[58] Field of Search ................................. 188/71.5, 71.6, 188/72.4, 24.22, 152

[56] References Cited

U.S. PATENT DOCUMENTS

| | | | |
|---|---|---|---|
| 3,524,979 | 8/1970 | Cohen | 240/2 |
| 3,633,437 | 1/1972 | Ishida | 74/489 |
| 4,064,974 | 12/1977 | Filderman | 188/71.3 |
| 4,505,363 | 3/1985 | Herbulot | 188/72.5 |
| 5,052,241 | 10/1991 | Nagano | 74/502.2 |
| 5,445,242 | 8/1995 | Pogorzelski et al. | 188/71.6 |

FOREIGN PATENT DOCUMENTS

| | | | |
|---|---|---|---|
| 552775A | 7/1993 | European Pat. Off. | B62M 25/04 |
| 615896B | 9/1994 | European Pat. Off. | B62M 25/04 |
| 2728321 | 6/1996 | France | F16D 55/36 |
| 3340410 | 5/1985 | Germany . | |
| 2159431 | 6/1990 | Japan . | |
| 674271 | 3/1994 | Japan . | |
| 681865 | 3/1994 | Japan . | |
| 681867 | 3/1994 | Japan . | |
| 6109048 | 4/1994 | Japan . | |
| 694060 | 4/1994 | Japan . | |
| 8170669 | 7/1996 | Japan . | |
| 953671 | 2/1997 | Japan . | |
| 953672 | 2/1997 | Japan . | |
| 9151967 | 6/1997 | Japan . | |
| 2076087 | 11/1981 | United Kingdom | F16D 55/36 |
| 2169065 | 7/1986 | United Kingdom | B62M 25/04 |

*Primary Examiner*—Christopher P. Schwartz
*Assistant Examiner*—C. T. Bartz
*Attorney, Agent, or Firm*—Shinjyu Global IP Counselors, LLP

[57] ABSTRACT

A bicycle disc brake assembly is provided with a brake disc support with a pair of floating discs and a bicycle disc brake caliper with three friction pads. The center or intermediate friction pad is a floating friction pad. The bicycle disc brake caliper can be provided with a cooling system that transfers heat away from the actuating fluid. The bicycle disc brake caliper also has a housing with a piston unit. The housing has a frame mounting member sized to be coupled to a portion of a bicycle frame. The piston unit is movably coupled to the housing between a release position, in which the piston unit is spaced from a brake disc mounted to a wheel of a bicycle, and a braking position, in which the piston unit engages the brake disc of the bicycle wheel. The coolant member has a coolant area for receiving coolant to create a coolant heat sink that transfers heat from the housing. The housing can have an actuating passage in fluid communication with the piston unit to move the piston unit via an actuating fluid. Alternatively, a cable instead of actuating fluid can be used to operate the piston unit.

20 Claims, 11 Drawing Sheets

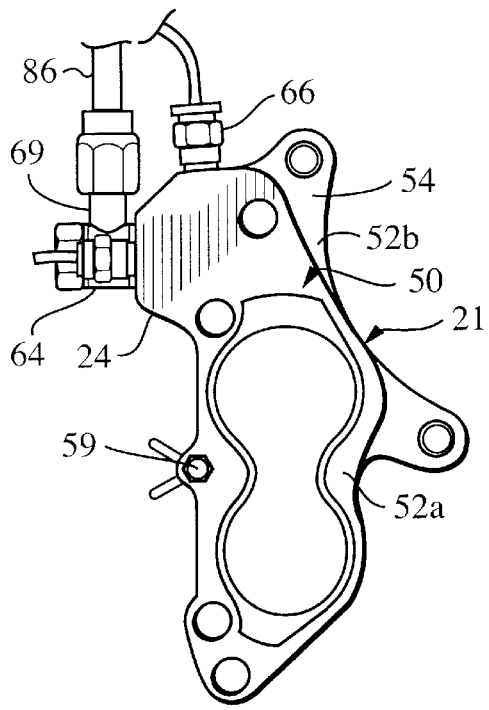
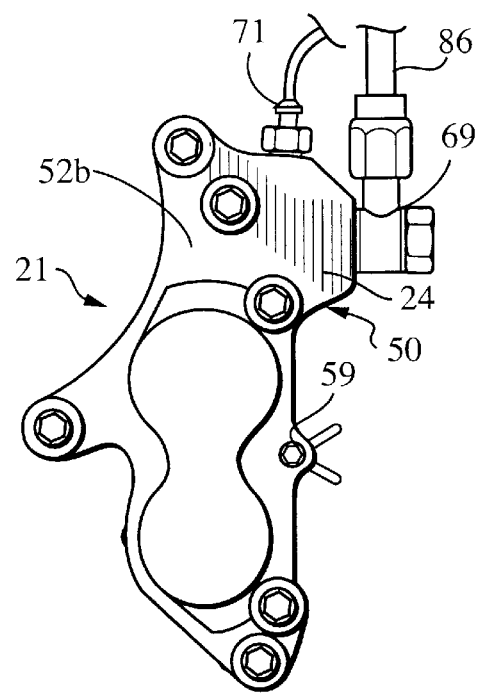
FIG. 10       FIG. 11
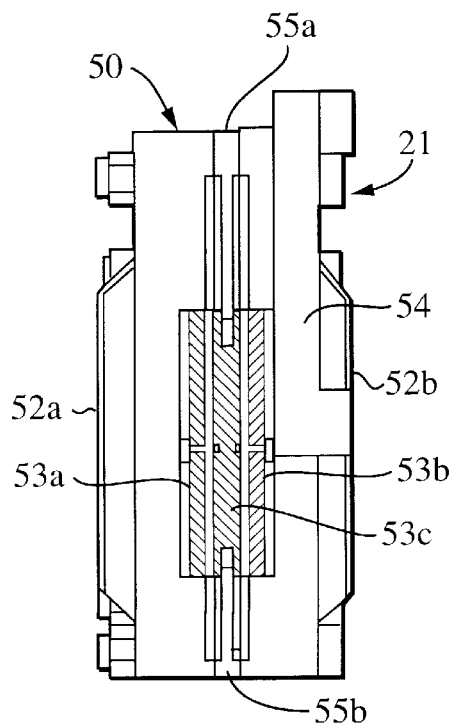
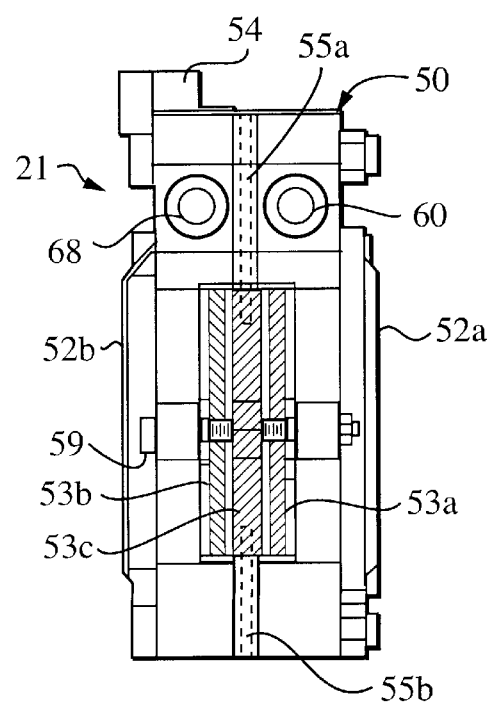
FIG. 12       FIG. 13

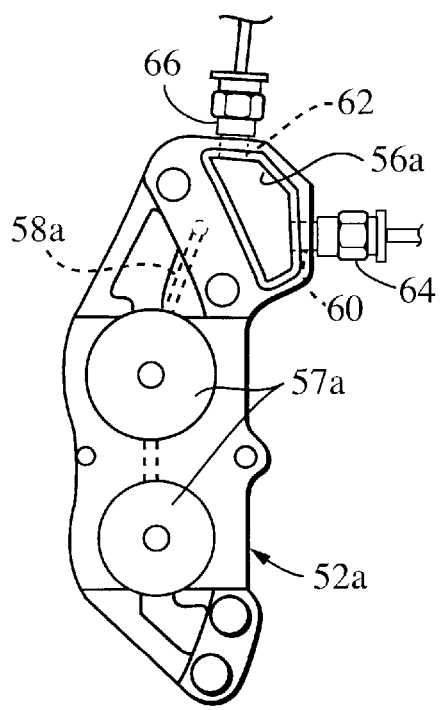
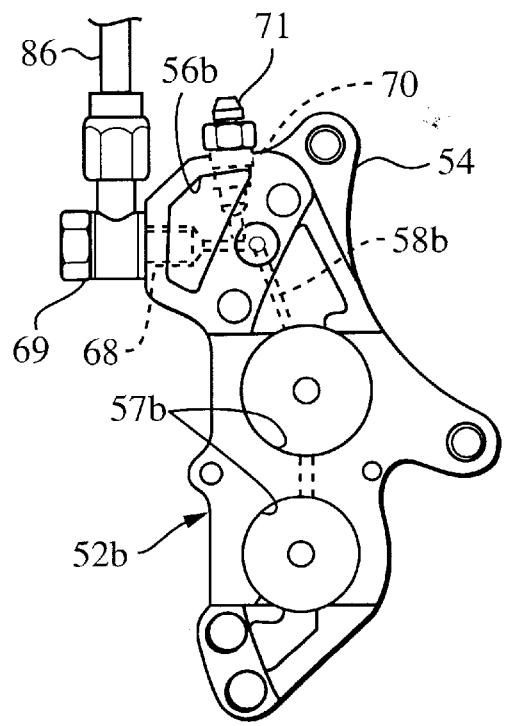
FIG. 16     FIG. 17
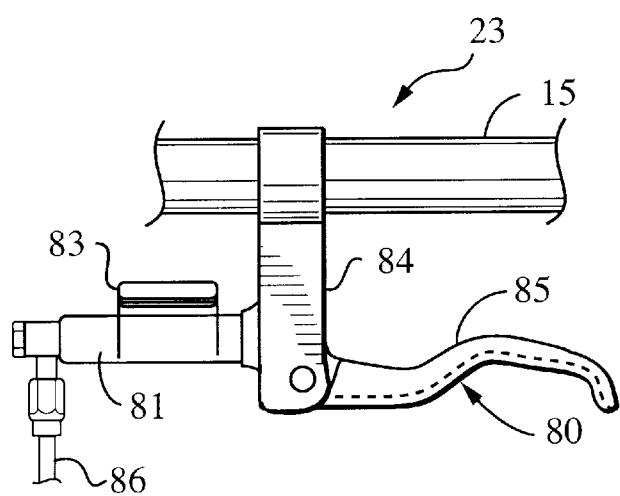
FIG. 18

DISC BRAKE ASSEMBLY

BACKGROUND OF THE INVENTION

1. Field of the Invention

This invention generally relates to disc brake assemblies. More specifically, the present invention relates to disc brake assemblies for bicycles.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc braking systems, i.e., disc brake systems that have more braking power.

In view of the above, there exists a need for a disc brake assembly, which has increased braking power over prior art disc brakes without substantially increasing the weight of the disc brakes. This invention addresses this need in the prior art as well as other needs, which will become apparent to those skilled in the art from this disclosure.

SUMMARY OF THE INVENTION

One object of the present invention is to provide a disc brake assembly, which has increased braking power.

Another object of the present invention is to provide a disc brake assembly that is relatively compact and lightweight in relation to the amount of braking power.

Another object of the present invention is to provide a disc brake assembly that is relatively inexpensive to manufacture.

The foregoing objects can be basically attained by providing a disc brake assembly comprising a support member, a first brake disc member, a second brake disc member, a caliper housing, a piston unit, a first friction member, a second friction member and a third friction member. The support member has a first attachment portion configured to be coupled to rotate with a rotating member and a second attachment portion. The first brake disc member is coupled to the second attachment portion of the support member. The second brake disc member is coupled to the second attachment portion of the support member. The second brake disc member is spaced from and arranged substantially parallel to the first brake disc member. The caliper housing includes an actuating passage for receiving an actuating fluid therein. The piston unit is movably coupled to the housing between a release position in and a braking position for applying a braking force to the first and second brake disc members. The first friction member is movably coupled to the housing by the piston unit to move between the release position and the braking position. The second friction member is coupled to the housing and arranged substantially parallel to the first friction member. The third friction member coupled to the housing and arranged substantially parallel to the first and second friction members.

The foregoing objects can further be attained by providing a brake caliper assembly comprising a caliper housing, a piston unit, a first friction member, a second friction member and a third friction member. The caliper housing includes an actuating passage for receiving an actuating fluid therein. The piston unit is movably coupled to the housing between a release position in and a braking position. The first friction member is movably coupled to the housing by the piston unit to move between the release position and the braking position. The second friction member is coupled to the housing and arranged substantially parallel to the first friction member. The third friction member is coupled to the housing and arranged substantially parallel to the first and second friction members.

The foregoing objects can further be attained by providing a brake disc component comprising a support member, a first brake disc member and a second brake disc member. The support member has a first attachment portion configured to be coupled to rotate with a rotating member and a second attachment portion. The first brake disc member is coupled to the second attachment portion of the support member. The second brake disc member is coupled to the second attachment portion of the support member. The second brake disc member is spaced from and arranged substantially parallel to the first brake disc member.

The foregoing objects can further be attained by providing a brake disc component comprising a support member, a first brake disc member and a coupling assembly. The support member has a first attachment portion configured to be coupled to rotate with a wheel and a second attachment portion. The first brake disc member is coupled to the second attachment portion of the support member and has a center rotational axis. The coupling assembly couples the first brake disc member to the second attachment portion of the support member for limited axial movement.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 10 is a first side elevational view of the brake caliper for the disc brake assembly of the present invention illustrated in FIGS. 1 and 2;

FIG. 11 is a second side elevational view of the bicycle disc brake caliper for disc brake assembly of the present invention illustrated in FIGS. 1, 2 and 10;

FIG. 12 is a front elevational view of the bicycle disc brake caliper of the bicycle disc brake assembly of the present invention illustrated in FIGS. 2, 10 and 11;

FIG. 13 is a rear elevational view of the bicycle disc brake caliper of the bicycle disc brake assembly of the present invention illustrated in FIGS. 1, 2 and 10–12;

FIG. 16 is an inside elevational view of a first housing half of the bicycle disc brake caliper of the bicycle disc brake assembly of the present invention illustrated in FIG. 1;

FIG. 17 is an inside elevational view of a second housing half of the bicycle disc brake caliper of the bicycle disc brake assembly of the present invention illustrated in FIG. 1;

FIG. 18 is a top plan view of the brake operating mechanism mounted on the handle bar of the bicycle in accordance with the embodiment of the present invention illustrated in FIG. 1.

DETAILED DESCRIPTION OF THE PREFERRED EMBODIMENTS

Figure 1:
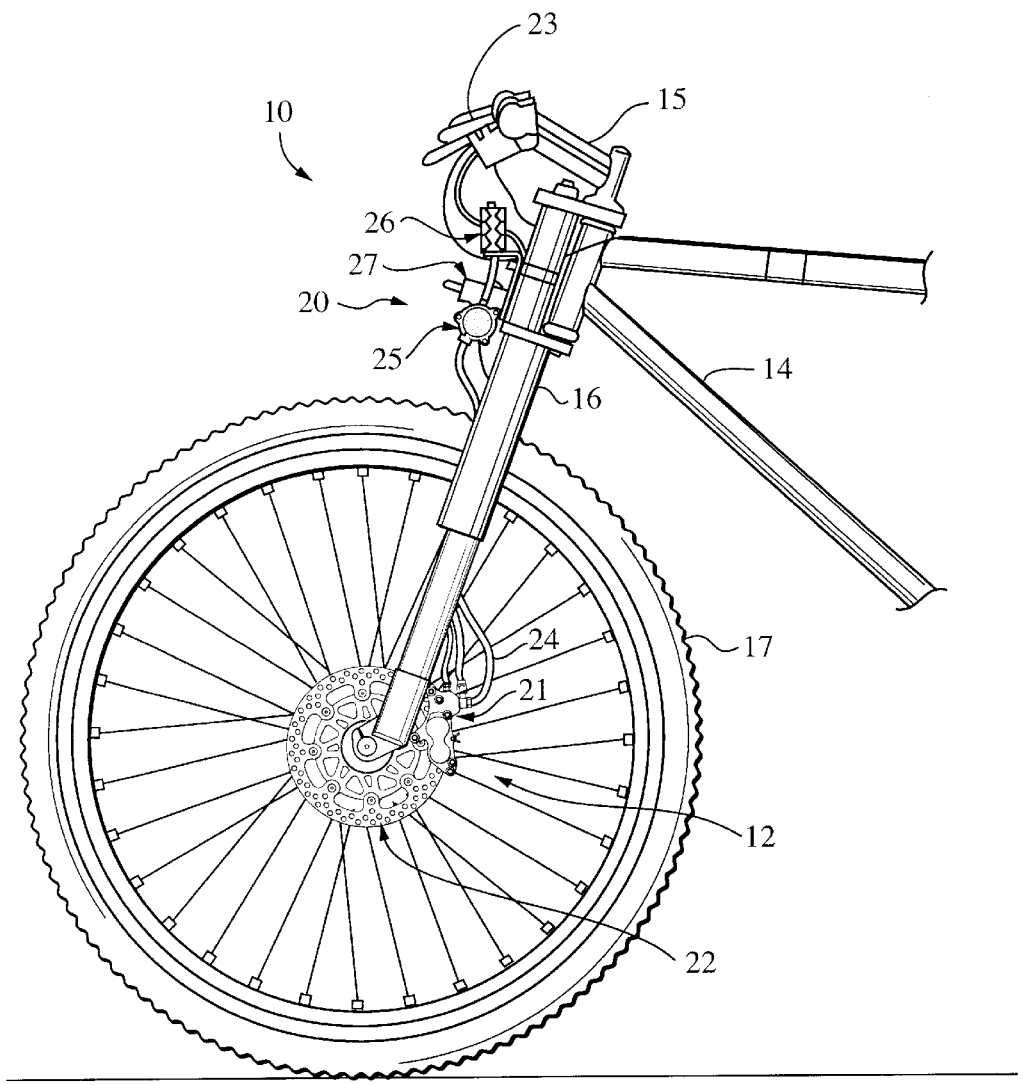
FIG. 1 is a side elevational view of a front portion of a bicycle with a bicycle disc brake assembly coupled thereto in accordance with one embodiment of the present invention.
Figure 2:
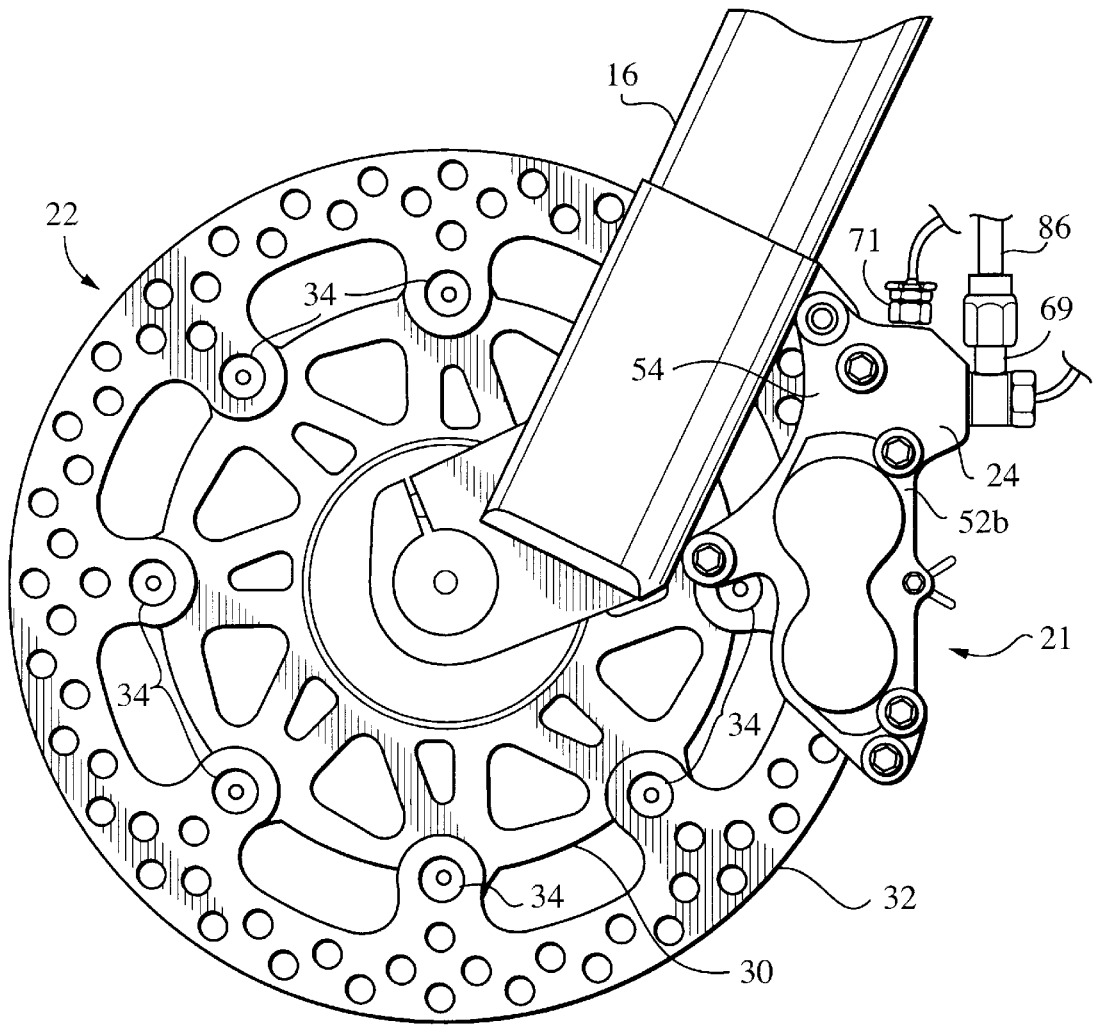
FIG. 2 is an enlarged, partial side elevational view of the bicycle disc brake assembly coupled to the front fork of the bicycle in accordance with the embodiment of the present invention illustrated in FIG. 1.
Figure 3:
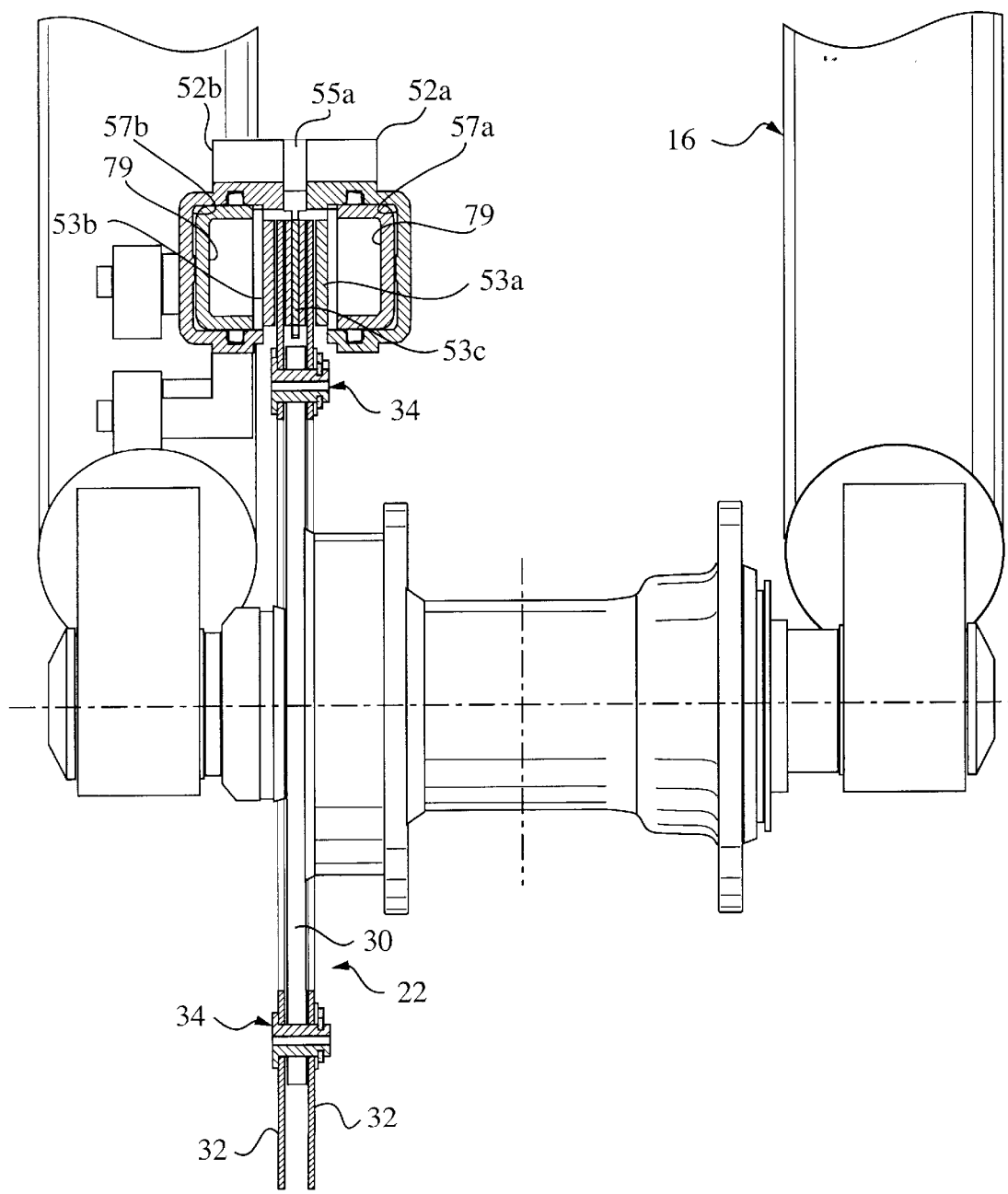
FIG. 3 is an enlarged, partial cross-sectional view of the bicycle disc brake assembly of the present invention illustrated in FIG. 1.
Figure 4:
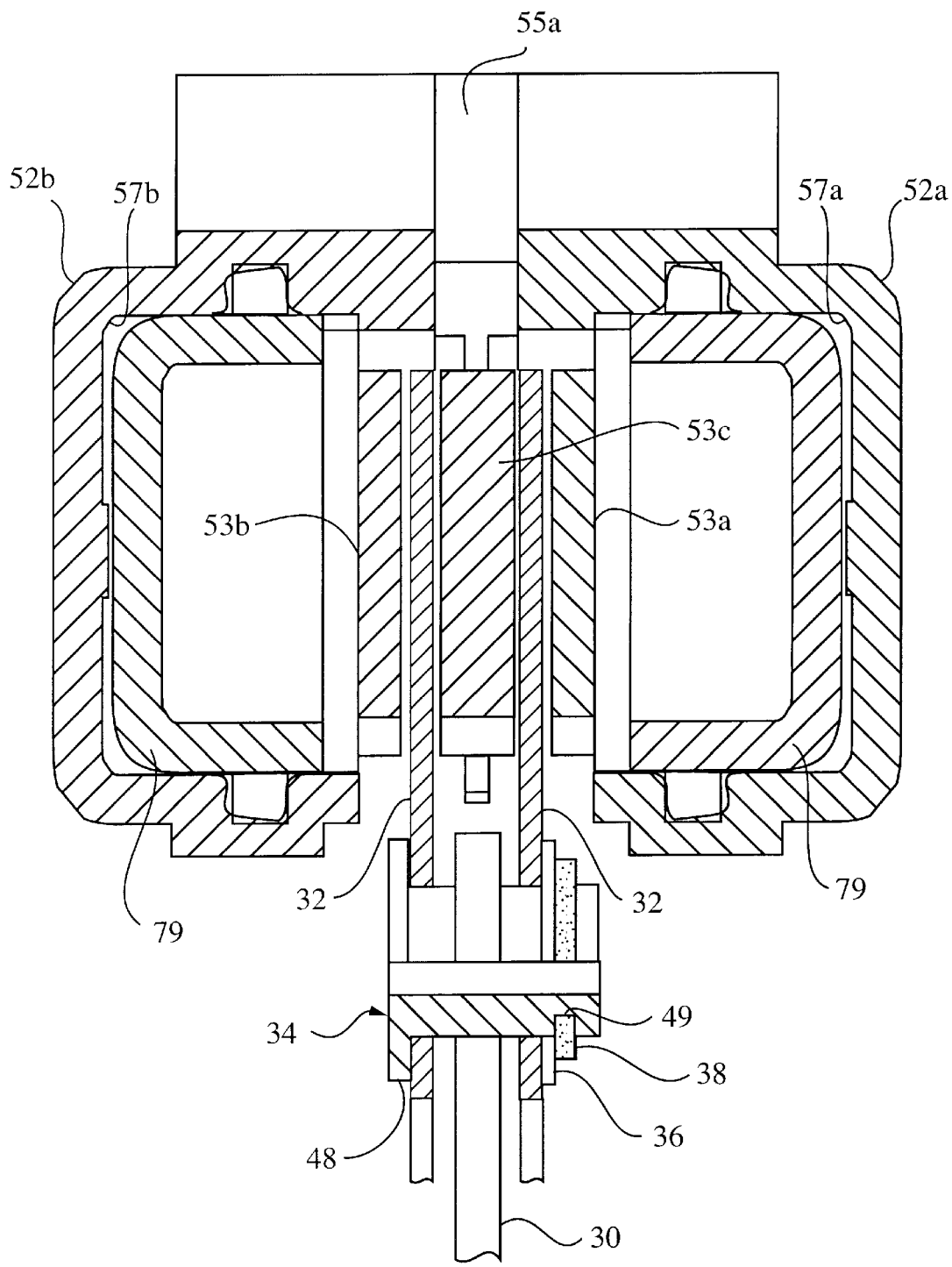
FIG. 4 is a farther enlarged, partial cross-sectional view of the bicycle disc brake assembly of the present invention illustrated in FIG. 1.

Referring initially to FIGS. 1 and 2, a front portion of a bicycle 10 is illustrated with a disc brake assembly 12 coupled thereto in accordance with one embodiment of the present invention. Bicycles such as bicycle 10 are well known in the art, and thus, bicycle 10 and its various components will not be discussed or illustrated in detail herein. It will be apparent to those skilled in the art that bicycle 10 can be any type of bicycle, e.g., mountain bike, a hybrid bike or a road bike. Bicycle 10 is a conventional bicycle, which basically includes a bicycle frame 14 with a handle bar 15, front and rear forks 16 (only front fork shown), front and rear wheels 17 (only front wheel shown) and a drive train (not shown).

While only the front portion of bicycle 10 is illustrated as having a disc brake assembly 12, it will be apparent to those skilled in the art from this disclosure that a second or rear disc brake assembly 12 can be utilized for stopping the rear wheel of bicycle 10. Also, while disc brake assembly 12 is illustrated as being a fluid cooled brake, it will be apparent to those skilled in the art from this disclosure that disc brake assembly 12 does not have to be a fluid cooled brake. Moreover, it will also be apparent to those skilled in the art from this disclosure that various changes and modifications can be made from the embodiments disclosed herein without departing from the scope of the invention as defined in the appended claims.

Disc brake assembly 12 basically includes a cooling system 20, a disc brake caliper 21, a brake disc component 22 and a brake operating mechanism 23. Cooling system 20 is basically mounted on the front fork 16 of bicycle 10. Likewise, disc brake caliper 21 is also mounted on front fork 16 of bicycle 10 adjacent brake disc component 22. Brake disc component 22 is fixedly coupled to front wheel 17 for rotation therewith. Brake operating mechanism 23 is preferably fixedly mounted on handle bar 15 adjacent the hand portion of handle bar 15. Accordingly, brake operating mechanism 23 is operated to move disc brake caliper 21 between a release position and a braking position. In particular, disc brake caliper 21 moves from a release position in which bicycle wheel 17 and brake disc component 22 are free to rotate, and a braking position in which disc brake caliper 21 applies a braking force against brake disc component 22 to stop rotation of bicycle wheel 17 and brake disc 22.

Figure 19:
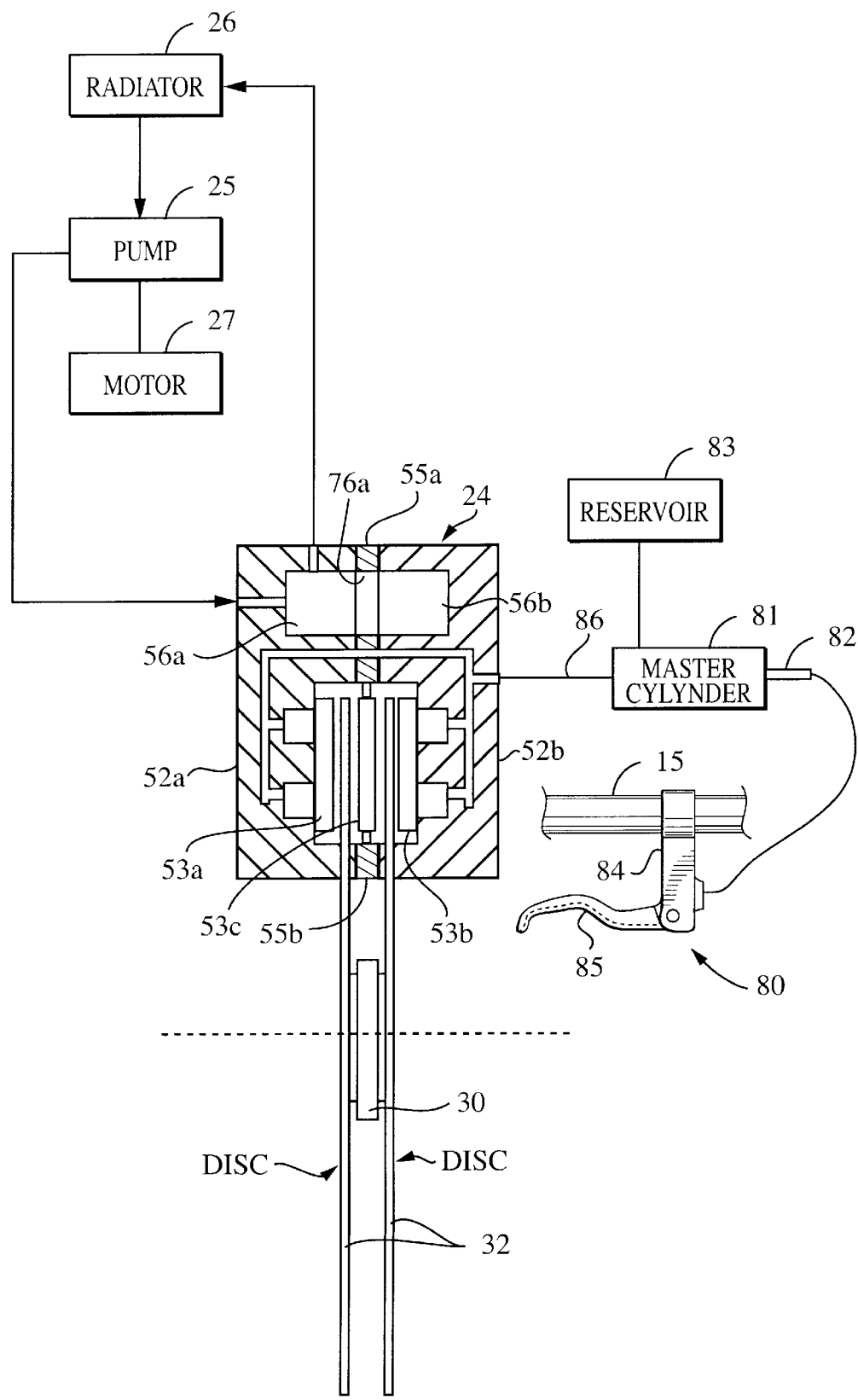
FIG. 19 is a schematic diagram of the bicycle disc brake assembly in accordance with the embodiment of the present invention illustrated in FIG. 1.

Referring to FIGS. 1 and 19, cooling system 20 is preferably designed to prevent vapor lock from occurring within disc brake caliper 21. Specifically, cooling system 20 is preferably designed to act as a coolant heat sink that transfers heat away from disc brake caliper 21. Cooling system 20 is disclosed in more detail in copending U.S. patent application Ser. No. 09/110,408, which was filed on Jul. 6, 1998. This copending application is incorporated herein by reference to more specifically explain cooling system 20.

As shown in FIG. 1, cooling system 20 basically includes a coolant member 24, pump 25 and radiator 26. In this embodiment, coolant member 24 is integrally formed with a portion of disc brake caliper 21. Of course, it will be apparent to those skilled in the art from this disclosure that coolant member 24 can be a separable member which is fixedly coupled to disc brake caliper 21 to create a coolant heat sink which transfers heat away from disc brake caliper 21.

Pump 25 is preferably a rotary pump, which is operated by an electric motor 27 to move coolant through coolant member 24 and radiator 26. In particular, a first flexible conduit extends from coolant member 24 to an inlet opening of radiator 26, a second flexible conduit extends from an outlet opening of radiator 26 to an inlet opening of pump 25, and a third flexible tubing extends from an outlet of pump 25 to coolant member 24. Accordingly, these flexible conduits form a continuous loop or conduit path between coolant member 24, pump 25 and radiator 26. Coolant is forced through the conduit path by pump 25 for removing heat from coolant member 24 and disc brake caliper 21.

Radiator 26 is preferably a conventional type of radiator, which includes a conduit path with a large surface area so as to be air-cooled. Since radiator 26 is relatively conventional in construction, radiator 26 will not be described or illustrated in detail herein. It will be apparent to those skilled in the art that pump 25 and/or radiator 26 can be eliminated. For example, the conduit path can be set up as a "coffee percolator" such that the coolant is self-circulating through coolant member 24.

Referring to FIGS. 5–9, brake disc component 22 basically includes a disc support 30, a pair of brake disc members 32 coupled to the outer periphery of disc support 30 by eight connecting pins 34, eight floating washers 36, and eight lock rings 38. Disc support 30 has a first attachment portion formed by a central opening 40, which includes splines for being fixedly coupled to the hub of bicycle wheel 17. Thus, disc support 30 rotates with wheel 17. The outer periphery of disc support 30 is provided with a second attachment portion having eight connecting holes 42 that receive connecting pins 34 therein for coupling brake disc members 32 thereto in a floating manner. In other words, brake disc members 32 are coupled to disc support 30 to allow movement of brake disc members 32 in an axial direction on connecting pins 34. This amount of axial movement of brake disc members 32 is preferably approximately 0.50 mm to approximately 0.60 mm per brake disc member 32. Accordingly, brake disc component 22 has twice the braking surface area as a single brake disc of the same size. This arrangement results in brake disc component 22 having twice the stopping power of a conventional brake disc of similar size.

Figure 9:
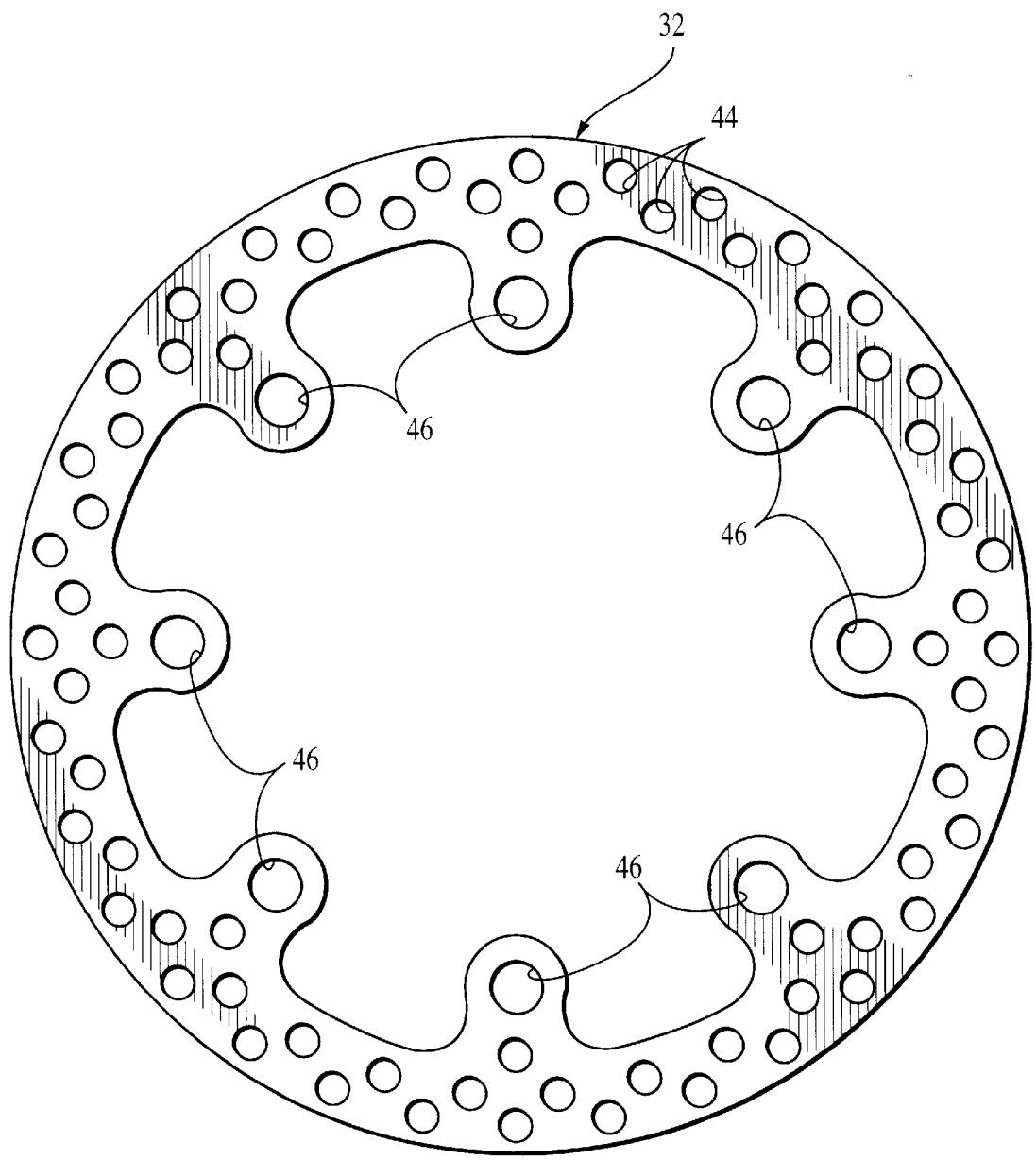
FIG. 9 is a side elevational view of one of the brake discs for the disc brake assembly of the present invention illustrated in FIGS. 5 and 6.

As best seen in FIG. 9, brake disc members 32 are preferably ring-shaped members with a plurality of vent holes 44 and eight connecting holes 46 for receiving connecting pins 34. Brake disc members 32 are positioned on opposite sides of disc support 30 such that the inner facing surfaces of brake disc members 32 are spaced axially relative to each other.

Figure 5:
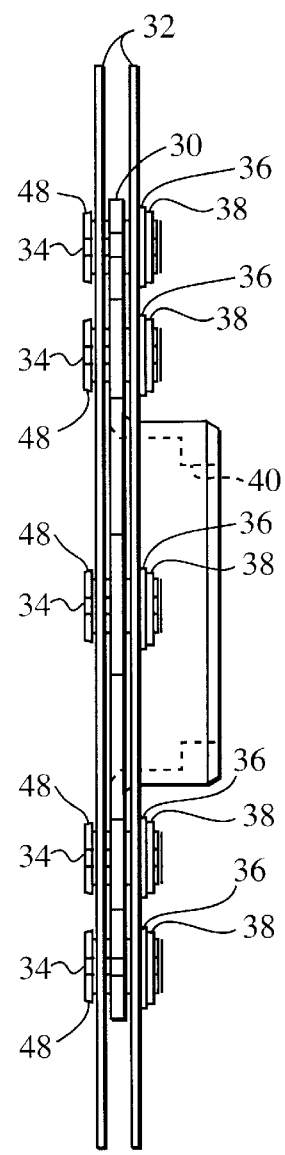
FIG. 5 is an edge elevational view of the brake disc component for the bicycle disc brake assembly of the present invention illustrated in FIG. 1.
Figure 6:
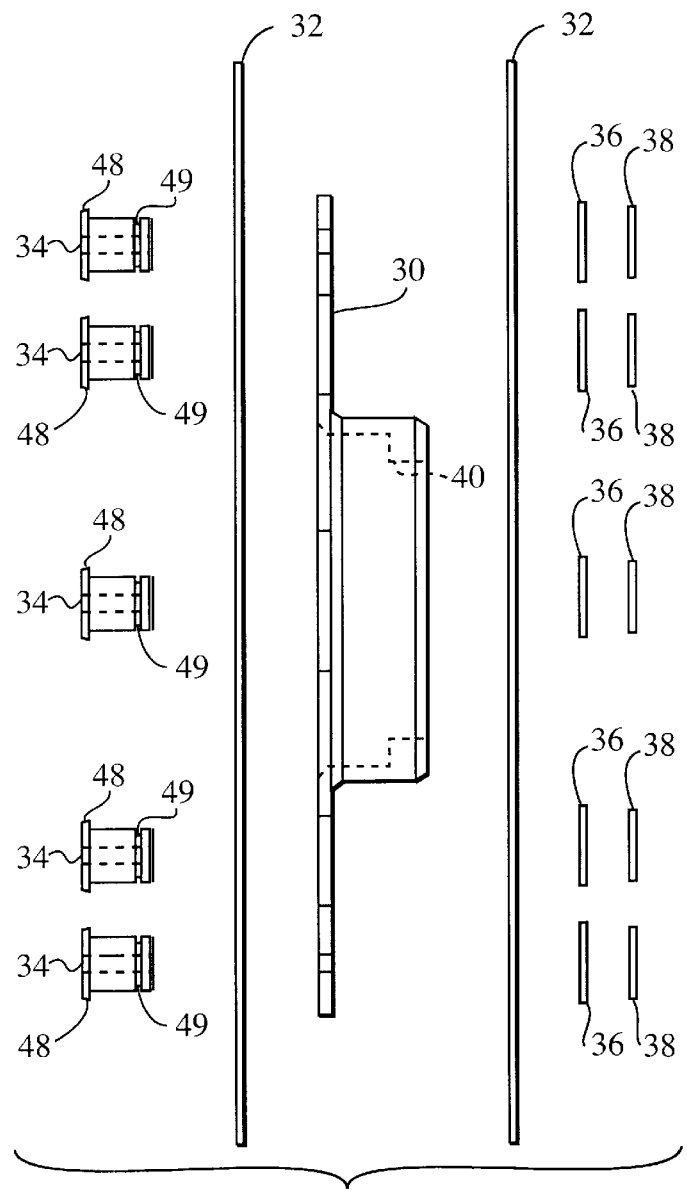
FIG. 6 is an exploded, edge elevational view of the brake disc component illustrated in FIG. 5.
Figures 7, 8:
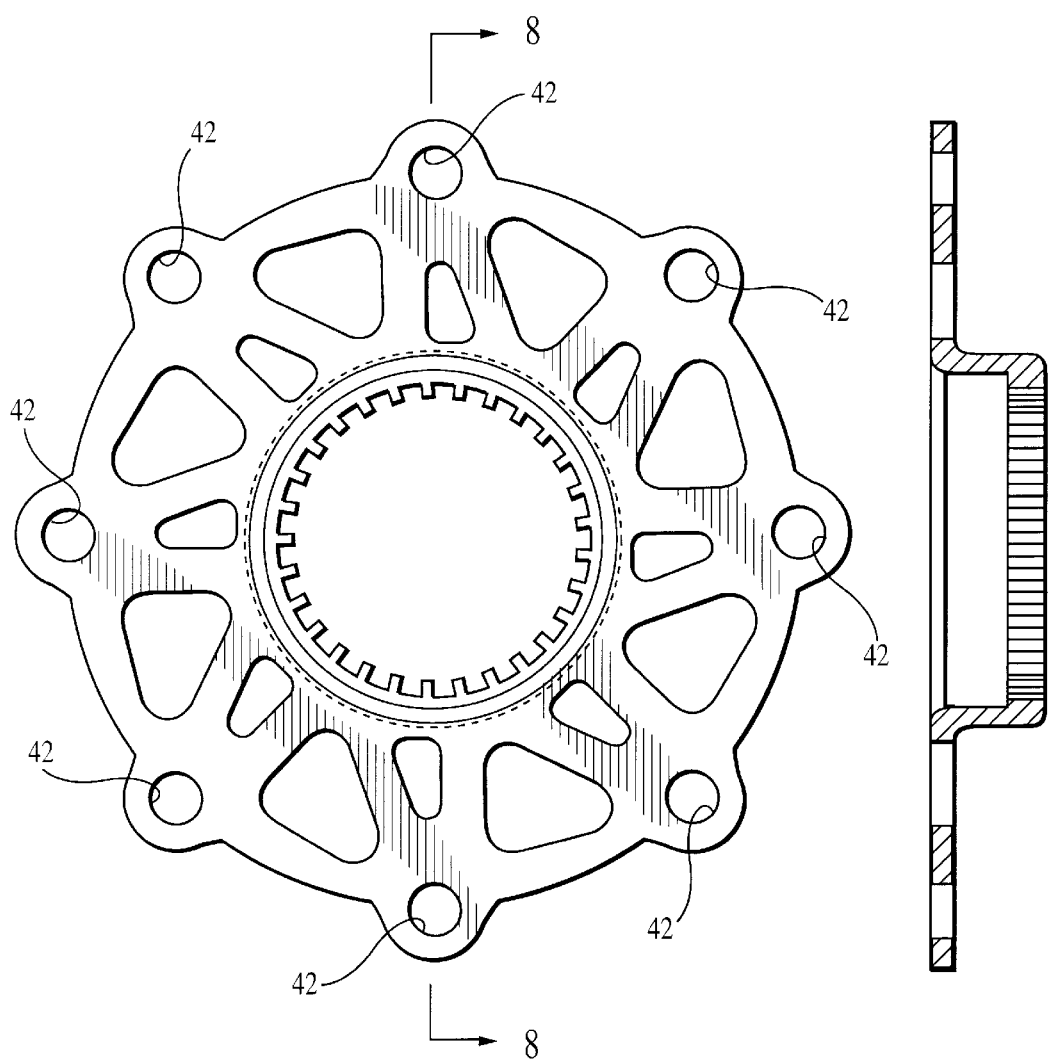
FIG. 7 is a side elevational view of the disc support for the brake disc component illustrated in FIGS. 6 and 7.
FIG. 8 is a transverse cross-sectional view of the disc support as viewed along section line 8—8 of FIG. 7.

As seen in FIGS. 5 and 6, connecting pins 34 are headed pin with a flange 48 at one end and an annular groove 49 at the other end. Grooves 49 of pins 34 receive lock rings or washers 38 to fixedly secure brake disc members 32 to the outer periphery of disc support 30. The floating washers 36 are located between the outer facing surface of one of the brake disc members and the opposite surface of the lock rings 38. By removing or changing the thickness of floating washers 36, the amount of axial float or movement of brake disc members 32 can be adjusted.

Turning now to FIGS. 10–17, disc brake caliper 21 will now be described in more detail. Disc brake caliper 21 is fixedly coupled to fork 16 adjacent to brake disc component 22 for applying a clamping force to stop the rotation of bicycle wheel 17 and brake disc component 22. Disc brake caliper 21 basically includes housing 50, piston unit 51, three friction pads 53a, 53b and 53c, and coolant member 24, which is integrally formed with housing 20. Disc brake caliper 21 is basically a conventional disc brake caliper, except that cooling system 20 has been coupled to it for removing heat therefrom and center friction pad 53c has been added for increased stopping power. More specifically, except for the addition of coolant member 24 and center friction pad 53c to disc brake caliper 21, the structure and function of disc brake caliper 21 are relatively conventional. Therefore, conventional aspects of disc brake caliper 21 will not be discussed or illustrated in detail herein.

As seen in FIGS. 10–17, housing 50 is preferably constructed of a heat conductive material, which can readily transfer the heat to the coolant. For example, housing 50 can be constructed of aluminum. Housing 50 includes a first housing half 52a, a second housing half 52b, an upper friction pad holder 55a and a lower friction pad holder 55b, which are bolted together in a conventional manner. For all practical purposes, first and second housing halves 52a and 52b are substantially identical in construction, except that housing half 52a has coolant system 20 attached thereto, and second housing half 52b has brake operating mechanism 23 attached thereto for supplying an actuating fluid to first and second housing halves 52a and 52b. Also, second housing half 52b has a pair of outwardly extending flanges that form a mounting member 54 for bolting disc brake caliper 21 to fork 16 of bicycle 10.

Figure 15:
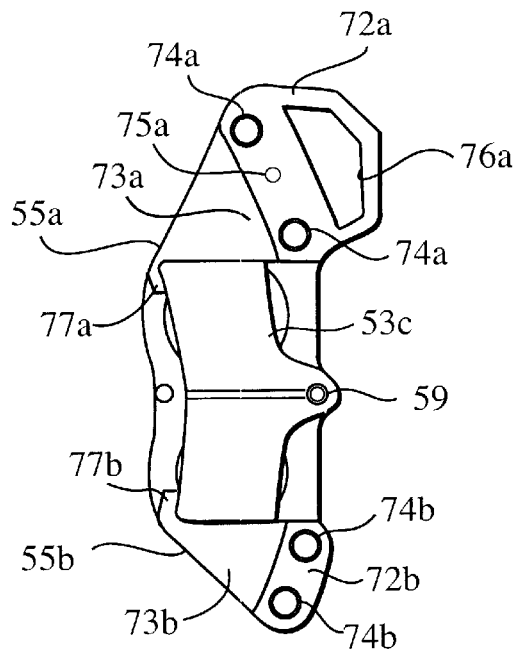
FIG. 15 is a side elevational view of the center pad and guide plates positioned on one of the caliper housings for the bicycle disc brake caliper of the present invention illustrated in FIGS. 1, 2 and 10–14.

As best seen in FIGS. 12, 13 and 15, upper and lower friction pad holders 55a and 55b are coupled between first and second housing halves 52a and 52b for supporting center friction pad 53c therebetween. Center friction pad 53c floats between first and second housing halves 52a and 52b. When housing halves 52a and 52b and pad holder 55a and 55b are all bolted together, a pair of disc brake slots are formed therebetween for receiving brake disc members 32 therein, i.e., between friction pads 53a, 53b and 53c.

As seen in FIGS. 16 and 17, first housing half 52a has a coolant cavity or area 56a, a pair of circular piston recesses 57a and an internal fluid actuating passage 58a. Likewise, second housing half 52b has a coolant cavity or area 56a, a pair of piston receiving recesses 57b and an internal fluid actuating passage 58b. Cavities or areas 56a and 56b form a large coolant chamber. Preferably, coolant member 24 can hold at least approximately ten cubic centimeters to approximately twenty cubic centimeters of coolant.

Coolant cavity or area 56a is a large chamber having an inlet opening 60 and an outlet opening 62. Inlet opening 60 is preferably a threaded hole, which receives a connector 64 to connect a conduit thereto. Outlet opening 62 is also preferably a threaded bore having an outlet connector 66 coupled thereto to connect a coolant conduit thereto. Connectors 64 and 66 are preferably provided with one-way valves or check valves that allow the fluid or coolant to pass into coolant cavities 56a and 56b through inlet opening 60 and out of coolant cavities 56a and 56b via outlet opening 62.

Internal fluid actuating passage 58a extends between circular piston recesses 57a and internal fluid actuating passage 58b of second housing half 52b. In other words, the actuating fluid from brake operating mechanism 23 flows into second housing half 52b and then into internal fluid actuating passages 58a and 58b to operate piston unit 51.

Second housing half 52b has a first threaded opening 68, which is in fluid communication with internal fluid actuating passage 58b. Opening 68 is designed for attaching a hydraulic or actuating fluid conduit 86 thereto via connector 69. A second opening 70 is also provided for threadedly receiving a bleed nipple 71. Opening 70 is in fluid communication with internal fluid actuating passage 58b such that excess air can be removed from the actuating system. Internal fluid actuating passage 58b interconnects piston recesses 57b together for receiving actuating fluid or hydraulic fluid to activate piston unit 51.

As seen in FIGS. 10, 11 and 13, friction pads 53a, 53b and 53c are all movably coupled between housing halves 52a and 52b by a bolt 59. Accordingly, piston unit 51 can move friction pads 53a and 53b towards center friction pad 53c to frictionally engage brake disc members 32. The center friction pad 53c is allowed to float between friction pads 53a and 53b. It will be apparent to those skilled in the art from this disclosure that the present invention can be adapted to be utilized with a braking system in which one of the end friction pads is fixed to the housing half, while the piston unit pushes the other end friction pad and the center friction pad towards the fixed friction pad.

As seen in FIG. 15, upper friction pad holder 55a has a mounting section 72a and a holding section 73a. Mounting section 72a has a pair of bolt holes 74a, a hydraulic fluid passageway 75a and a coolant passageway 76a. Mounting section 72a is clamped between housing halves 52a and 52b via bolts extending through bolt holes 74a. Hydraulic passageway 75a interconnects internal fluid passages 58a and 58b of the first and second housing halves 52a and 52b. Coolant passageway 76a interconnects coolant cavities 56a and 56b so as to form a continuous coolant cavity therebetween. Holding section 73a of the upper friction pad holder 55a is thinner than the mounting section 72a for accommodating brake disc members 32. At the free end of holding section 73a is a hook member 77a for holding center friction pad 53c from rotating about the mounting bolt 59.

Lower friction pad holder 55b is similar to upper friction pad holder 55a except that it does not have the hydraulic passageway or coolant passageway. Lower friction pad holder 55b includes a mounting section 72b and a holding section 73b. The mounting section 72b has a pair of bolt holes 74b for fixedly securing lower friction pad holder 55b between the housing halves 52a and 52b. The holding section 73b is thinner than the mounting section 72b for accommodating brake disc members 32. A hook member 77b is formed at the free end of the holding section 73b for preventing rotation of the center friction pad 53c about the mounting bolt 59.

Figure 14:
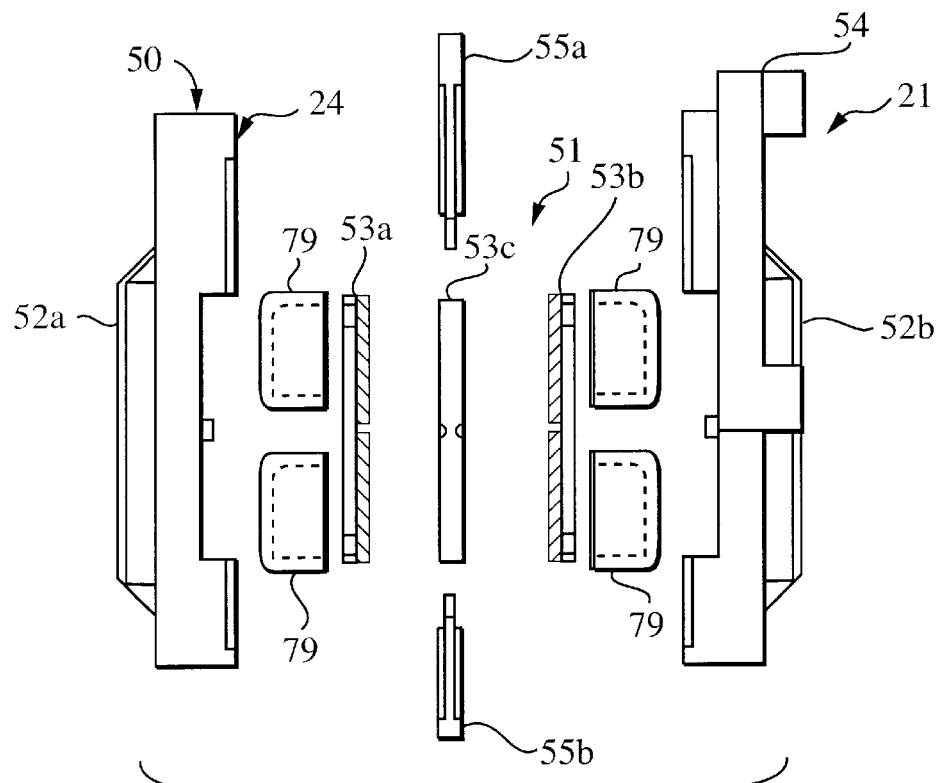
FIG. 14 is an exploded elevational view of the bicycle disc brake caliper of the disc brake assembly of the present invention illustrated in FIGS. 1, 2 and 10–13.

As seen in FIG. 14, piston unit 51 preferably includes four pistons 79, which engage friction pads 53a and 53b. Pistons 79 are slidably received in piston recesses 57a and 57b for movement between a release position and a braking position. Friction pads 53a and 53b are located on the free ends of pistons 79 for movement therewith. In other words, as pistons 79 move from a release position to a braking position, friction pads 53a and 53b also move from a release position to a braking position. In the braking position, friction pads 53a, 53b and 53c frictionally engage brake disc members 32 to stop the rotation of brake disc component 22 and wheel 17. In the release position, friction pads 53a, 53b and 53c are spaced from brake disc members 32 to allow brake disc component 22 and wheel 17 to freely rotate therebetween. Pistons 79 and friction pads 53a and 53b are moved from their release positions to their braking positions by actuating or hydraulic fluid applying a force to pistons 79. More specifically, as brake operating mechanism 23 is actuated, actuating fluid is pressurized so as to force pistons 79 and friction pads 53a and 53b toward brake disc component 22. Alternatively, pistons 79 can be operated by a cable instead of by actuating fluid.

When brake caliper 21 is coupled to front fork 16 as seen in FIGS. 1 and 2, coolant member 24 is preferably positioned on the downstream end of the disc brake caliper 21. In other words, as seen in FIG. 1, brake disc members 32 rotates in a counterclockwise direction such that the coolant member 24 is positioned downstream on disc brake caliper 21 in relationship to the rotational direction of brake disc members 32. This allows the heat to be removed from the downstream end of brake caliper 21 more quickly since this is the area in which the actuating fluid is being supplied and the area of increased heat.

Referring now to FIGS. 18 and 19, brake operating mechanism 23 will now be described in more detail. Basically, brake operating mechanism 23 is designed to actuate the disc brake caliper 21 to apply a forcible gripping action on brake disc component 22 to stop rotation of front wheel 17. Brake operating mechanism 23 basically includes a brake lever 80, a hydraulic or master cylinder 81, a hydraulic or master piston 82, and an actuation fluid reservoir 83.

Preferably, brake operating mechanism 23 is a single unit which is mounted on handlebar 15. In particular, brake lever 80 includes a mounting portion 84 and a lever portion 85. Mounting portion 84 is designed to be clamped onto handle bar 15 in a conventional manner. Mounting portion 84 is integrally formed with master cylinder 81 such that master cylinder 81, master piston 82 and actuation fluid reservoir 83 are all supported on mounting portion 84 of brake lever 80. Lever portion 85 is pivotally coupled to mounting portion 84 for movement between a release position and a braking position. Normally, lever portion 85 is maintained in a release position in a conventional manner, e.g. a return spring (not shown).

Master piston 82 is movably mounted within master cylinder 81 in a conventional manner. More specifically, actuation fluid reservoir 83 is mounted on master cylinder 81 and in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line 86 which is coupled to disc brake caliper 21. Thus, the pressurized actuation fluid causes the pistons 79 and friction pads 53a and 53b to move so that friction pads 53a, 53b and 53c engage brake disc members 32 to stop rotation of wheel 17.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A disc brake assembly comprising:
    a support member having an inner section with a first attachment portion configured to be coupled to rotate with a rotating member and an outer peripheral section with a second attachment portion;
    a first brake disc member movably coupled to said second attachment portion of said support member on a first lateral side of said outer peripheral section of said support member;
    a second brake disc member movably coupled to said second attachment portion of said support member on a second lateral side of said outer peripheral section of said support member, said second brake disc member being spaced from and arranged substantially parallel to said first brake disc member;
    a caliper housing with a piston unit movably coupled thereto between a release position and a braking position for applying a braking force to said first and second brake disc members;
    a first friction member movably coupled to said housing by said piston unit to move between said release position and said braking position;
    a second friction member coupled to said housing and arranged substantially parallel to said first friction member; and
    a third friction member coupled to said housing and arranged substantially parallel to said first and second friction members.

2. A disc brake assembly according to claim 1, wherein said housing includes a coolant cavity.

3. A disc brake assembly according to claim 1, wherein said first and second brake disc members are coupled to said support member by connecting pins.

4. A disc brake assembly according to claim 3, wherein said first and second brake disc members are slidably mounted on said connecting pins for movement relative to said support member.

5. A disc brake assembly according to claim 1, wherein said first brake disc member is mounted on a first axial side of said support member and said second brake disc member is mounted on a second axial side of said support member.

6. A disc brake assembly according to claim 1, wherein said first and second brake disc members are vented.

7. A disc brake assembly according to claim 1, wherein said second friction member is movably coupled to said housing.

8. A disc brake assembly according to claim 7, wherein said third friction member is movably coupled to said housing.

9. A disc brake assembly according to claim 7, wherein said piston unit engages said first friction member to move said second friction member between said release position and said braking position.

10. A disc brake assembly according to claim 9, wherein said third friction member is movably coupled to said housing.

11. A disc brake assembly according to claim 10, wherein said piston unit has a pair of first pistons engaging said first friction member and a pair of second pistons engaging said second friction member.

12. A brake disc component comprising:

a support member having an inner section with a first attachment portion configured to be coupled to rotate with a rotating member and an outer peripheral section with a second attachment portion;

a first brake disc member movably coupled to said second attachment portion of said support member on a first lateral side of said outer peripheral section of said support member; and a second brake disc member movably coupled to said second attachment portion of said support member on a second lateral side of said outer peripheral section of said support member, said second brake disc member being spaced from and arranged substantially parallel to said first brake disc member.

13. A brake disc component according to claim 12, wherein said first and second brake disc members are coupled to said support member by connecting pins.

14. A brake disc component according to claim 13, wherein said first and second brake disc members are slidably mounted on said connecting pins for movement relative to said support member.

15. A brake disc component according to claim 12, wherein said first brake disc member is mounted on a first axial side of said support member and said second brake disc member is mounted on a second axial side of said support member.

16. A brake disc component according to claim 12, wherein said first and second brake disc members are vented.

17. A brake disc component comprising:

a support member having an inner section with a first attachment portion configured to be coupled to rotate with a wheel and an outer peripheral section with a second attachment portion;

a first brake disc member movably coupled to said second attachment portion of said support member on a first lateral side of said outer peripheral section of said support member, said first brake disc member having a center rotational axis;

a second brake disc member movably coupled to said second attachment portion of said support member on a second lateral side of said outer peripheral section of said support member, said second brake disc member having a center rotational axis; and a coupling assembly movably coupling said first and second brake disc members to said first and second lateral sides of said second attachment portion of said support member such that said outer peripheral section of said support member limits axial movement of said first and second brake disc members.

18. A brake disc component according to claim 17, wherein said coupling assembly includes connecting pins movably coupling said first and second brake disc members to said second attachment portion.

19. A brake disc component according to claim 18, wherein said coupling assembly further includes locking members and floating washers located on said connecting pins.

20. A brake disc component according to claim 17, wherein said first and second brake disc members are vented.

* * * * *